United States Patent
Tanaka et al.

(10) Patent No.: US 8,099,232 B2
(45) Date of Patent: Jan. 17, 2012

(54) VEHICLE CONTROL DEVICE

(75) Inventors: Hiroaki Tanaka, Toyota (JP); Shoji Inagaki, Numazu (JP); Wataru Ike, Toyota (JP); Naoki Okada, Toyota (JP); Tetsuji Muto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 289 days.

(21) Appl. No.: 11/480,461

(22) Filed: Jul. 5, 2006

(65) Prior Publication Data

US 2007/0035416 A1     Feb. 15, 2007

(30) Foreign Application Priority Data

Aug. 11, 2005    (JP) ................. 2005-233171

(51) Int. Cl.
*G06G 7/76* (2006.01)
*G08G 1/00* (2006.01)
*G08G 1/07* (2006.01)

(52) U.S. Cl. ............................. 701/117; 340/906

(58) Field of Classification Search .................. 701/45, 701/117, 301; 342/70, 71, 72, 455, 456, 342/457
See application file for complete search history.

(56) References Cited

U.S. PATENT DOCUMENTS

| | | | | |
|---|---|---|---|---|
| 7,274,306 | B2 * | 9/2007 | Publicover | 340/907 |
| 7,607,741 | B2 * | 10/2009 | Seto et al. | 303/193 |
| 2001/0044697 | A1 * | 11/2001 | Kageyama | 701/301 |
| 2004/0181339 | A1 * | 9/2004 | Mukaiyama | 701/301 |
| 2004/0193347 | A1 * | 9/2004 | Harumoto et al. | 701/45 |

FOREIGN PATENT DOCUMENTS

| | | |
|---|---|---|
| JP | 6-36197 | 2/1994 |
| JP | 8-11579 | 1/1996 |
| JP | 2002-140799 | 5/2002 |
| JP | 2005-10937 | 1/2005 |

* cited by examiner

*Primary Examiner* — Tuan C. To
*Assistant Examiner* — Imran Mustafa
(74) *Attorney, Agent, or Firm* — Oblon, Spivak, McClelland, Maier & Neustadt, L.L.P.

(57) ABSTRACT

In a vehicle control device which performs braking control of a vehicle, a priority setting unit determines, when a possibility that a self-vehicle and another vehicle cross each other at an intersection in front of the self-vehicle is detected, a priority for each of the self-vehicle and the other vehicle with respect to access to the intersection. A braking control unit performs, when the self-vehicle has no priority over the other vehicle with respect to access to the intersection, the braking control of the self-vehicle so that the self-vehicle enters the intersection after the other vehicle passes through the intersection.

22 Claims, 4 Drawing Sheets

VEHICLE CONTROL DEVICE

BACKGROUND OF THE INVENTION

1. Field of the Invention

The present invention generally relates to a vehicle control device which performs braking control of a vehicle. More particularly, the present invention relates to a vehicle control device which enables the vehicle to pass through an intersection smoothly and safety with necessary minimum deceleration.

2. Description of the Related Art

Conventionally, the traffic control for making smooth the vehicle traffic is carried out by urging the observance of traffic control regulations. For example, the contents of the traffic control regulations are transferred from the infrastructure side to the drivers of respective vehicles by using the traffic signals installed at the crossings, the traffic-control signs installed along the roads, the stop lines drawn on the roads, etc.

In order to make the traffic control effective, it is necessary that the drivers of the respective vehicles keep in mind and understand the general traffic regulations, such as the meanings of the traffic control signs, and operate the respective vehicles to follow the traffic control regulations.

The cases in which the traffic control was carried out but traffic accidents have occurred are roughly categorized into: 1) the case in which the drivers did not follow or could not have followed the traffic control restrictions received from the infrastructure side; and 2) the case in which the infrastructure for the traffic control (traffic signals, etc.) was not ready and the contents of traffic control restrictions are indefinite for the drivers.

Conventionally, there has been proposed some techniques as the countermeasures for the above case 1). One of the techniques is to warn the driver of the vehicle concerned of existence of another vehicle with an excessive speed or crossing possibility, based on the information acquired using the vehicle-to-vehicle communication or the road-to-vehicle communication. Another technique is to support the operation of the driver of the vehicle concerned by performing automatic deceleration control of the vehicle in a special state. For example, see Japanese Laid-Open Patent Application No. 2002-140799.

However, according to the conventional technique disclosed in Japanese Laid-Open Patent Application No. 2002-140799, deceleration control is given to both the intersection passing vehicles, unless certain rules, standards, or agreements about intersection entry are set up in advance between the vehicles which are determined as having mutually crossing possibility. For this reason, the vehicles running through the intersection may not become smooth.

Moreover, there has been proposed some techniques as the countermeasures for the above case 2). According to the traffic control depending on the infrastructure, it is very difficult and unrealistic that all the intersections of all scales, such as large-scale intersections or small-scale intersections of residential street, are provided with the traffic signals and the stop lines. Inevitably, the intersection in which the traffic control is not practically carried out as in the case of the above item 2) may exist.

At such intersection where the traffic control is not practically carried out, the priority of intersection access will be indefinite to the drivers, and the actual traffic control will be entrusted to the discretion or mutual concession of the drivers who operate the vehicles accessing the intersection, which are uncertain factors. In fact, many of traffic accidents took place accidentally upon meeting suddenly in narrow street intersections without the traffic signal and stop line.

Another problem of the above-mentioned traffic control depending on the infrastructure is that the contents of the traffic control are fixed and cannot be dynamically adapted for changes of the traffic quantity.

In a certain limited area, the traffic signs indicating the contents of traffic control are changed or the lighting time of each of the colors of the traffic signals is changed on a week day or time zone basis. However, such techniques of the traffic control are carried out only in the limited areas only, and it is difficult for such techniques to change dynamically the contents of the traffic control on real time.

As mentioned above, in the case of the traffic control depending on the infrastructure, the prerequisite is that the drivers of the respective vehicles observe the traffic control directions indicated by the traffic signals, signs, etc. If the contents of the traffic control are fixed, the drivers of the respective vehicles must observe even when no crossing vehicles exist. For example, when no crossing vehicle exists but the stop line exists or the traffic signal is in red, the vehicle concerned must be stopped on the stop line or slowed down. This worsens the flow of traffic.

Thus, the traffic control depending on the infrastructure conventionally used as a matter of course has the following two problems: a) it is practically impossible to control all the intersections; and b) the control to stop or slow down the vehicles is performed unnecessarily even at the time of a small amount of traffic, and the unnecessary stop and unnecessary slowdown will worsen the flow of traffic.

In order to slow down or stop either of the crossing vehicles with the positional relationship having crossing possibility on a two-dimensional plane without using the traffic signals, signs, stop lines, etc. and allow the vehicles to pass through the intersection area smoothly, it is desirable to reconstruct the intersection having the crossing roads into a two-level intersection.

However, it is actually impossible to reconstruct all the existing intersections into two-level intersections.

SUMMARY OF THE INVENTION

Embodiments of the present invention solve or reduce one or more of the above-mentioned problems.

According to one aspect of the invention there is provided a vehicle control device which enables the vehicle to pass through an intersection smoothly and safety with necessary minimum deceleration.

In an embodiment of the invention which solves or reduces one or more of the above-mentioned problems, there is provided a vehicle control device which performs braking control of a vehicle, the vehicle control device comprising: a priority setting unit determining, when a possibility that a self-vehicle and another vehicle cross each other at an intersection in front of the self-vehicle is detected, a priority for each of the self-vehicle and the other vehicle with respect to access to the intersection; and a braking control unit performing, when the self-vehicle has no priority over the other vehicle with respect to access to the intersection, the braking control of the self-vehicle so that the self-vehicle enters the intersection after the other vehicle passes through the intersection.

The above-mentioned vehicle control device may be configured so that, when the self-vehicle has no priority over the other vehicle with respect to access to the intersection, the braking control unit converts coordinates indicating an actual position of the other vehicle into new coordinates which indicate a virtual position of the other vehicle as if the other vehicle run on a same lane in a same direction as a preceding vehicle of the self-vehicle, and performs the braking control of the self-vehicle so as to maintain a predetermined distance between the self-vehicle and the other vehicle based on the new coordinates.

The above-mentioned vehicle control device may be configured so that, when the self-vehicle has no priority over the other vehicle with respect to access to the intersection, the braking control unit performs the braking control of the self-vehicle by determining a position of a first predetermined distance from the intersection as being a target stop position until the other vehicle passes through the intersection, and cancels the performance of the braking control the instant the other vehicle passes through the intersection.

The above-mentioned vehicle control device may be configured so that, when the self-vehicle arrives at a second predetermined distance from the intersection and a distance between the other vehicle and the intersection is smaller than the second predetermined distance, the priority setting unit determines the priority for each of the self-vehicle and the other vehicle so that the self-vehicle has no priority over the other vehicle.

The above-mentioned vehicle control device may be configured so that, when the self-vehicle arrives at a third predetermined distance from the intersection and a time for the other vehicle to reach the intersection is smaller than a time for the self-vehicle to reach the intersection, the priority setting unit determines the priority for each of the self-vehicle and the other vehicle so that the self-vehicle has no priority over the other vehicle.

The above-mentioned vehicle control device may be configured so that the priority determined by the priority setting unit until the self-vehicle arrives at a fourth predetermined distance from the intersection is not changed before the self-vehicle passes through the intersection.

The above-mentioned vehicle control device may be configured so that, when no priority vehicle exists until the self-vehicle arrives at the fourth predetermined distance from the intersection and a possibility that the self-vehicle and a new vehicle cross each other at the intersection is detected thereafter, the vehicle control device determines a priority for each of the self-vehicle and the newly detected vehicle so that the self-vehicle has no priority over the newly detected vehicle, and performs the braking control of the self-vehicle so that the self-vehicle enters the intersection after the newly detected vehicle passes through the intersection.

The above-mentioned vehicle control device may be configured so that, when no priority vehicle exists until the self-vehicle arrives at the fourth predetermined distance from the intersection and a possibility that the self-vehicle and a new vehicle cross each other at the intersection is detected thereafter, the new vehicle having a position detecting accuracy level lower than that of the self-vehicle and being located within a range of a fifth predetermined distance from the intersection the instant the self-vehicle arrives at the fourth predetermined distance, the priority setting unit determines a priority for each of the self-vehicle and the newly detected vehicle so that the self-vehicle has no priority over the newly detected vehicle.

The above-mentioned vehicle control device may be configured so that, when the position detecting accuracy level of the newly detected vehicle is lower than that of the self-vehicle but higher than a predetermined level, the priority setting unit determines a priority for each of the self-vehicle and the newly detected vehicle so that the self-vehicle has a priority over the newly detected vehicle.

The above-mentioned vehicle control device may be configured so that, when both a vehicle speed of the other vehicle and a vehicle speed of the self-vehicle are less than a predetermined speed, after the crossing possibility is detected and the non-priority of the self-vehicle to the other vehicle is set up, and the self-vehicle is located on a left side of the other vehicle, the braking control unit cancels the braking control of the self-vehicle.

The above-mentioned vehicle control device may be configured so that, when the braking control of the self-vehicle is canceled, a notification of the braking control cancellation is given to a passenger of the self-vehicle.

The above-mentioned vehicle control device may be configured so that, when the self-vehicle has no priority over the other vehicle and a traffic signal in the intersection is detected, the braking control unit cancels the braking control of the self-vehicle.

The above-mentioned vehicle control device may be configured so that, when the self-vehicle has no priority over the other vehicle and a traffic signal in the intersection is detected and a color of a turned-on light of the traffic signal is red, the braking control unit performs the braking control of the self-vehicle to cause the self-vehicle to stop by a stop line of the intersection, and thereafter cancels the braking control of the self-vehicle.

The above-mentioned vehicle control device may be configured so that, when the self-vehicle has no priority over the other vehicle and no traffic signal in the intersection is detected, the braking control unit cancels the braking control of the self-vehicle.

In another embodiment of the invention which solves or reduces one or more of the above-mentioned problems, the above-mentioned vehicle control device is configured to transmit first priority information set up in the self-vehicle, to another vehicle with crossing possibility through communication, and configured to receive second priority information set up in the other vehicle, from the other vehicle through communication.

The above-mentioned vehicle control device may be configured so that, when the second priority information is not received from said other vehicle until the self-vehicle reaches a sixth predetermined distance from the intersection, the priority setting unit determines the priority for each of the self-vehicle and said other vehicle so that the self-vehicle has no priority over the other vehicle.

The above-mentioned vehicle control device may be configured so that, when a vehicle speed of the self-vehicle is zero and a period of a continuous waiting state exceeds a predetermined time, priority information which sets the self-vehicle as a priority vehicle compulsorily is broadcasted to neighboring vehicles having crossing possibility.

The above-mentioned vehicle control device may be configured so that, when a possibility that the self-vehicle and an emergency vehicle cross each other at the intersection is detected, the priority setting unit determines the priority for each of the self-vehicle and the emergency vehicle so that the self-vehicle has no priority over the emergency.

The above-mentioned vehicle control device may be configured so that each of the first and the second priority information exchanged between the self-vehicle and the other vehicle is set up in consideration of vehicle information or driver information of the self-vehicle and the other vehicle.

The above-mentioned vehicle control device may be configured so that a right-turn vehicle which is going to turn to the right at the intersection is determined as being a priority vehicle to the self-vehicle, and wherein, when the self-vehicle reaches a seventh predetermined distance from the intersection and the right-turn vehicle has not yet performed right-turn passage of the intersection, the priority setting unit cancels the priority determined for the right-turn vehicle and determines a priority of the self-vehicle over the right-turn vehicle.

The above-mentioned vehicle control device may be configured so that, when determining crossing possibility, the vehicle control device uses vehicle position information which indicates a vehicle position of each of the self-vehicle and other vehicles and is defined as a two-dimensional area.

The above-mentioned vehicle control device may be configured to communicate with neighboring vehicles via a relay station installed in the intersection.

According to the embodiments of the invention, it is possible to provide the vehicle control device which enables the vehicle to pass through the intersection smoothly and safely with necessary minimum deceleration.

BRIEF DESCRIPTION OF THE DRAWINGS

Other objects, features and advantages of the invention will be apparent from the following detailed description when read in conjunction with the accompanying drawings.

DETAILED DESCRIPTION OF PREFERRED EMBODIMENTS

A description will now be provided of embodiments of the invention with reference to the accompanying drawings.

A vehicle control device in an embodiment of the invention will be explained using FIG. 1 through FIG. 4. The vehicle control device 100 in this embodiment is implemented in an automotive vehicle, in order to realize the traffic control according to the invention.

Figure 1:
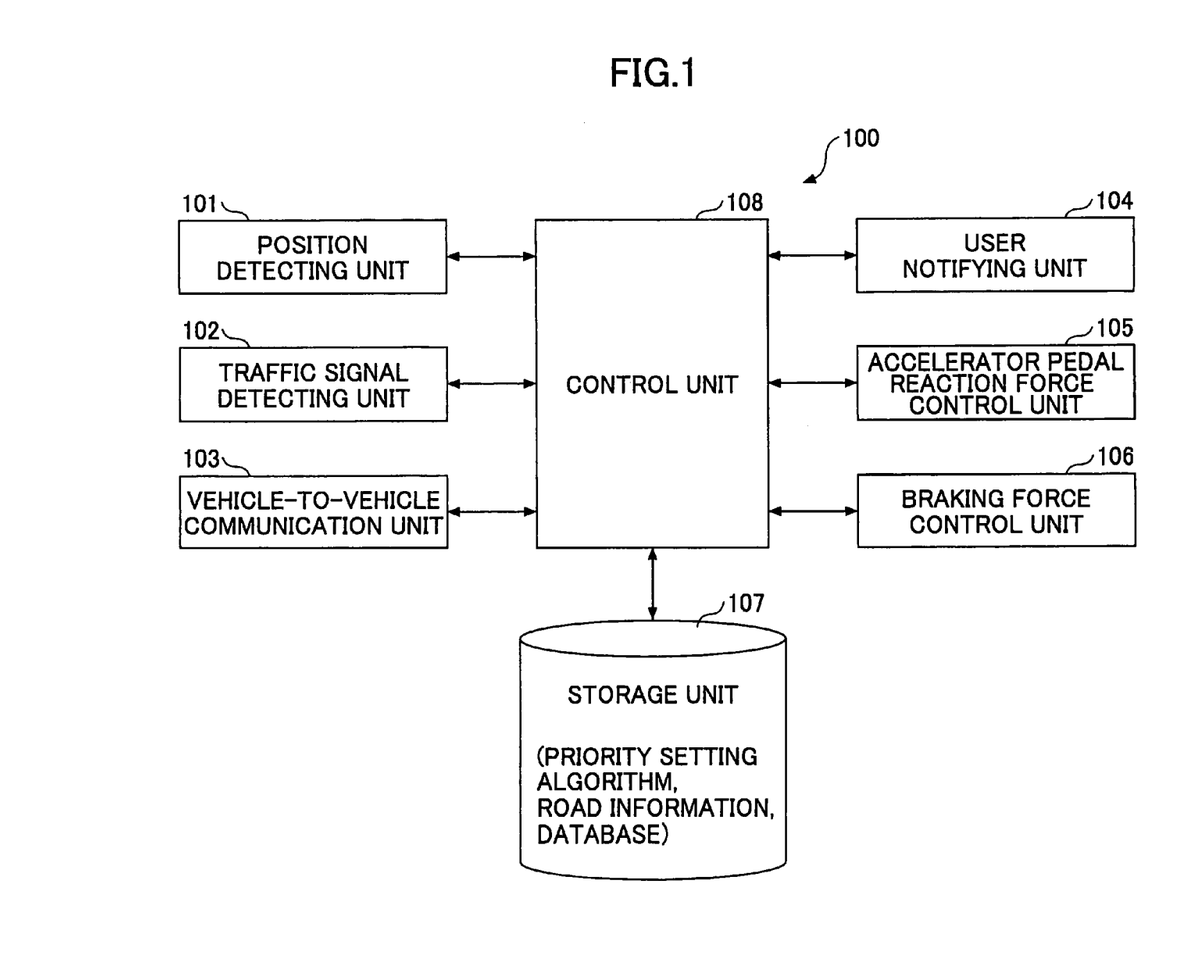
FIG. 1 is a block diagram showing the composition of a vehicle control device in an embodiment of the invention.

The composition of the vehicle control device 100 in this embodiment will be explained using FIG. 1. FIG. 1 shows the composition of the vehicle control device 100 in this embodiment.

As shown in FIG. 1, the vehicle control device 100 comprises a position detecting unit 101 which detects a current position of the self-vehicle. In this embodiment, it is desirable that each vehicle is able to detect the current position of the self-vehicle with sufficient accuracy. For this purpose, the position detecting unit 101 in this embodiment may include a high precision GPS (global positioning system), such as RTK-GPS (real-time kinematic global positioning system).

The position detecting unit 101 may be used in common with an external in-vehicle system of the vehicle control device 100 (for example, a navigation system).

The vehicle control device 100 comprises a traffic signal detecting unit 102 which detects the existence of a traffic signal in an intersection in front of the self-vehicle, and detects a currently turned-ON color (red/blue/yellow) of the traffic signal if the traffic signal exists in the intersection. For example, the traffic signal detecting unit 102 in this embodiment may have a wireless communication function. This traffic signal detecting unit 102 acquires the information related to the traffic signal from the infrastructure side through the road-to-vehicle communication, so that the existence of the traffic signal and the currently turned-ON color of the traffic signal may be detected. Alternatively, the traffic signal detecting unit 102 in this embodiment may include a front imaging camera. This traffic signal detecting unit 102 may detect the existence of the traffic signal and the currently turned-ON color of the traffic signal by carrying out the image processing of a moving picture or still picture acquired by the front imaging camera.

The vehicle control device 100 comprises a vehicle-to-vehicle communication unit 103 which performs the wireless communication directly with another vehicle in the area surrounding the self-vehicle, or indirectly with the other vehicle through a relay station. There is no special restriction regarding the antenna performance, the configuration, the communication protocol or the frequency bands, etc. of the vehicle-to-vehicle communication unit 103 which are used for the communication, and they may be arbitrarily provided.

Various techniques and composition of the vehicle-to-vehicle communication device have been proposed and known in the art, and a description thereof will be omitted. And the vehicle-to-vehicle communication unit 103 in this embodiment may employ any of the known techniques and composition.

The vehicle control device 100 comprises a user notifying unit 104 which notifies the user (or the driver of the self-vehicle) by the sense of hearing, sight or touch of the information related to the braking control of the vehicle control device 100 when the necessity arises. The function of the user notifying unit 104 will be explained later.

The vehicle control device 100 comprises an accelerator pedal reaction force control unit 105 which generates an operating reaction force of an arbitrary magnitude on the accelerator pedal by using an actuator, and controls the accelerator pedal reaction force.

Various structures and mechanisms in which the accelerator pedal reaction force control unit 105 generates the operating reaction force of the arbitrary magnitude on the accelerator pedal have been proposed and known in the art, and a description thereof will omitted. The accelerator pedal reaction force control unit 105 in this embodiment may employ any of the known structures and mechanisms.

The vehicle control device 100 comprises a braking force control unit 106 which generates an assistant braking force in addition to the brake operation by the driver. Various structures and mechanisms in which the braking force control unit 106 generates the assistant braking force have been proposed and known in the art, and a description thereof will be omitted. The braking force control unit 106 in this embodiment may employ any of the known structures and mechanisms.

The function of the braking force control unit 106 is mainly to perform deceleration of the self-vehicle. The braking force control unit 106 does not serve to inhibit the braking operation by the driver or does not serve to repeal the braking operation by the driver. For example, when the driver discovers the front obstacle and depresses the brake pedal further while the assistant braking force is generated, the braking force exceeding the assistant braking force generated by the braking force control unit 106 should be demonstrated.

The vehicle control device 100 comprises a storage unit 107 which stores a priority setting algorithm in this embodiment. Moreover, the storage unit 107 stores road information. It is preferred that the road information stored in the storage unit 107 is suitably updated to the newest road information by using the communication. Moreover, the storage unit 107 stores a database containing the data related to vehicles and/or the data related to drivers. The composition of the storage unit 107 will be described later.

For example, the storage unit 107 may be a recording medium, such as a memory or a hard disk. There is no special restriction of the kind of storage medium, storage technique, storage capacity, etc., and the storage unit 107 in this embodiment may employ any of the known storage media.

The road information stored in the storage unit 107 may be used in common with an external in-vehicle system of the vehicle control device 100 (for example, a navigation system).

The vehicle control device 100 comprises a control unit 108 which controls operation of the whole vehicle control device 100. For example, the control unit 108 is an ECU (electrical control unit), and there is no special restriction of the kind of ECU and the performance of arithmetic operation. The control unit 108 in this embodiment may be any of the known electrical control units.

In the above-described vehicle control device 100, the control unit 108 transmits the self-vehicle current position detected by the position detecting unit 101, to the other vehicle in the area surrounding the self-vehicle through broadcasting by using the vehicle-to-vehicle communication unit 103.

The vehicle speed of the self-vehicle detected by the vehicle speed detecting unit which is not shown in FIG. 1 may be transmitted together with the current position of the self-vehicle.

If the vehicle speed information is not transmitted, the vehicle receives the vehicle position information from another vehicle, and calculates the estimated vehicle speed of the source vehicle transmitting the vehicle position information by a time change of the vehicle position information. The vehicle position information (and the vehicle speed) transmitted through broadcasting may be received at a neighboring vehicle through the relay station which is a fixed station or a mobile station. For example, the relay station may be arranged near the center of the intersection so that all the vehicles on the crossing roads can share the relay station.

In order to absorb a position detection error, the vehicle position information may be defined as being a two-dimensional area (or, the vehicle occupancy area). With respect to the vehicle occupancy area, the current area and the predicted future area may be defined based on: a) the position and vehicle speed of the vehicle datum point, b) the vehicle direction and the relative positions of the vehicle corner datum points, c) the predicted movement position, and d) the predicted course position.

The control unit 108 acquires from the other vehicle in the area surrounding the self-vehicle the vehicle position information by using the vehicle-to-vehicle communication unit 103. As mentioned above, the control unit 108 acquires or computes the vehicle speed of the source vehicle transmitting the vehicle position information.

The control unit 108 analyses the acquired vehicle position information based on the road information stored in the storage unit 107, and recognizes the relative position between the self-vehicle and the other vehicle on the road.

And the control unit 108 detects a possibility that the self-vehicle and the other vehicle cross each other at the intersection in front of the self-vehicle, based on the recognized relative position between the self-vehicle and the other vehicle (the distance to the intersection, the vehicle speed, etc.). Various techniques for detection of the crossing possibility between the self-vehicle and the other vehicle at the intersection have been proposed and known in the art, and a description thereof will be omitted.

The control unit 108 determines a priority for each of the self-vehicle and the other vehicle by comparing the recognized relative position with the priority setting algorithm stored in the storage unit 107 when a possibility that the self-vehicle and the other vehicle cross each other at the intersection is detected. The priority with respect to the access to the intersection is determined for each of the self-vehicle and the other vehicle. Hence, the preferential passage of the intersection is permitted for one of the self-vehicle and the other vehicle.

For example, when the self-vehicle arrives at a predetermined distance from the intersection and a distance between the other vehicle and the intersection is smaller than the predetermined distance, the control unit 108 determines the priority for each of the self-vehicle and the other vehicle so that the self-vehicle has no priority over the other vehicle.

Moreover, when the self-vehicle arrives at a predetermined distance from the intersection and a time for the other vehicle to reach the intersection is smaller than a time for the self-vehicle to reach the intersection, the control unit 108 determines the priority for each of the self-vehicle and the other vehicle so that the self-vehicle has no priority over the other vehicle.

When the self-vehicle has no priority over the other vehicle (or when the other vehicle has a priority over the self-vehicle with respect to the access to the intersection), the control unit 108 controls the accelerator pedal reaction force control unit 105 and/or the braking force control unit 106 to decelerate the self-vehicle so that, after the other vehicle passes through the intersection, the self-vehicle enters the intersection.

Specifically, when the other vehicle has a priority over the self-vehicle with respect to the access to the intersection, the control unit 108 converts the coordinates indicating an actual position of the other vehicle into new coordinates which indicate a virtual position of the other vehicle as if the other vehicle run on the same lane in the same direction as the preceding vehicle of the self-vehicle. The control unit 108 controls the accelerator pedal reaction force control unit 105 and/or the braking force control unit 106 to perform the braking control of the self-vehicle by determining a position of a predetermined distance from the intersection as being a target stop position, thereby maintaining a predetermined distance between the self-vehicle and the other vehicle based on the new coordinates (in this case, the other vehicle is the priority vehicle the new coordinates of which are calculated). The instant the other vehicle (or the priority vehicle) passes through the intersection, the control unit 108 cancels the performance of the braking control.

On the other hand, when it is determined that the self-vehicle has a priority over the other vehicle, the control unit 108 does not perform the braking control but allows the self-vehicle to pass through the intersection according to the operation of the driver. In this case, it is determined on the other crossing vehicle that the crossing vehicle is a non-priority vehicle, and the crossing vehicle performs the braking control based on the determination.

The determination that the self-vehicle has a priority over the other vehicle means that the braking control for the non-priority vehicle in this embodiment is not performed, and an arbitrary running of the self-vehicle according to the operation of the driver is permitted. However, this does not means that the operation of the driver is disregarded, the priority vehicle is controlled compulsorily, and the priority vehicle is caused to pass through the intersection ahead of the non-priority vehicle. Namely, the operation of the vehicle to pass through the intersection is dependent on the driver. If the driver performs a slowdown operation when it is determined that the self-vehicle has a priority over the other vehicle, then the self-vehicle does not pass through the intersection preferentially ahead of the other vehicle.

Figure 2:
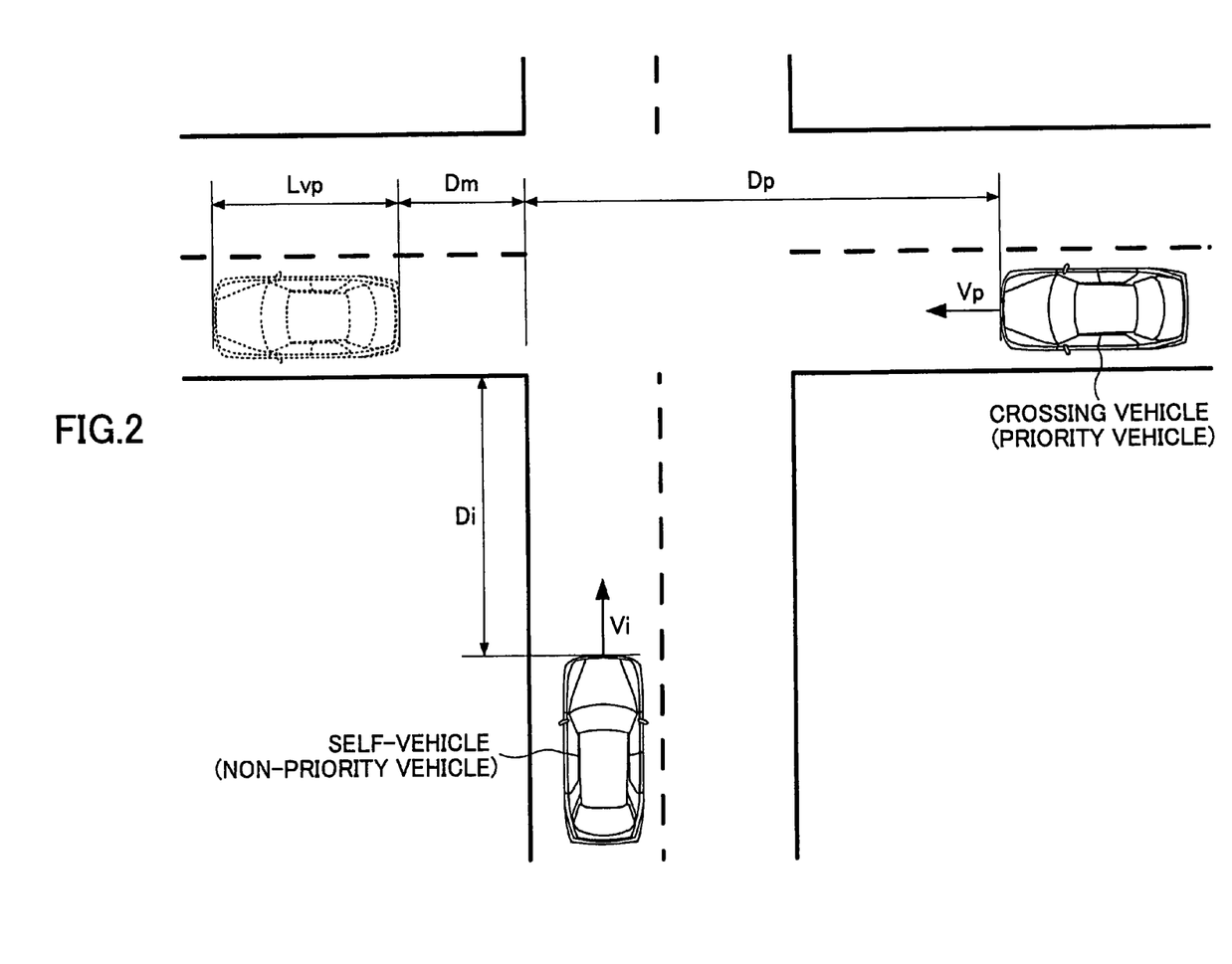
FIG. 2 is a diagram for explaining operation of the vehicle control device in an embodiment of the invention when the self-vehicle runs straight through an intersection in front of the self-vehicle.

FIG. 2 is a diagram for explaining operation of the vehicle control device in an embodiment of the invention when the self-vehicle runs straight through the intersection in front of the self-vehicle. In this case, the self-vehicle is a non-priority vehicle, and the crossing vehicle is made to pass through the intersection preferentially ahead of the self-vehicle.

When it is determined that the crossing vehicle is a priority vehicle and the self-vehicle is a non-priority vehicle, the control unit 108 computes a quantity of deceleration and a braking force of the self-vehicle which are required for making the crossing vehicle to pass through the intersection ahead of the self-vehicle, as follows.

The control unit 108 computes an estimated time T1 needed for the priority vehicle to pass through the intersection in front of the self-vehicle, the estimated time T1 starting from the instant the crossing vehicle is determined as being a priority vehicle. The estimated time T1 is computed in accordance with the formula: $T1=(Lvp+Dm+Dp)/Vp$ where Dp denotes a distance Dp from the front of the crossing vehicle at the time of the priority setting to the intersection exit (the back end of the crossing vehicle as shown in FIG. 2, Lvp denotes the overall length of the crossing vehicle, Vp denotes the vehicle speed of the crossing vehicle, and Dm denotes a margin distance (which is a function of the vehicle speed Vp).

In this case, the overall length Lvp of the crossing vehicle may be acquired together with the vehicle current position and the vehicle speed by using the vehicle-to-vehicle communication. Alternatively, the overall length Lvp of the crossing vehicle may be determined, in the light of the database stored beforehand in the self-vehicle, from the vehicle type which is received, together with the vehicle current position and the vehicle speed, by the vehicle-to-vehicle communication.

The control unit 108 computes an estimated time T2 needed for the non-priority vehicle to reach the intersection from the instant the self-vehicle is determined as being a non-priority vehicle. The estimated time T2 is computed in accordance with the formula: $T2=Di/Vi$ where Di denotes a distance from the front end of the self-vehicle at the time of the priority setting to the intersection entrance (the front end of the self-vehicle) and Vi denotes the vehicle speed Vi of the self-vehicle, as shown in FIG. 2.

After the self-vehicle is determined as being a non-priority vehicle, the control unit 108 of the self-vehicle computes a braking force Fb to be generated in the self-vehicle, which controls the vehicle speed Vi of the self-vehicle to make the crossing vehicle (which is a priority vehicle) to pass through the intersection ahead of the self-vehicle, and make the self-vehicle (which is a non-priority vehicle) to enter the intersection thereafter. Namely, the braking force Fb is computed such that the condition $T1<T2$ is satisfied.

In the case of $T1<0$, which means that the crossing vehicle (which is a priority vehicle) has already passed through the intersection, it is determined that the braking force required for the self-vehicle is zero, namely it is set up as Fb=0.

In the case of $T1 \geq 0$, it is necessary to generate a braking force to decelerate the self-vehicle (which is a non-priority vehicle), and the braking force Fb to be generated in the self-vehicle is determined by the formula $Fb=K/(T3)^n$ where K is an appropriately set positive constant, T3 is a sum of the estimated time T1 and the estimated time T2 (T3=T1+T2), and n is a positive real number.

Namely, in this embodiment, the larger the estimated time T1 of the priority vehicle and/or the estimated time T2 of the non-priority vehicle are, the smaller the braking force Fb required for the non-priority vehicle is.

According to the vehicle control device of this embodiment, the braking force Fb which is generally in inverse proportion to the total estimated time T3 is generated in the non-priority vehicle, and if the estimated time T1 changes from a positive value to a negative value due to the passing of the priority vehicle through the intersection, the braking force Fb generated in the non-priority vehicle is gradually or smoothly decreased to zero. After the priority vehicle passes through the intersection, the self-vehicle which was determined as being the non-priority vehicle is permitted to pass through the intersection according to the operation of the driver without receiving any deceleration control.

In this embodiment, the braking force Fb needed for decelerating the non-priority vehicle so that the condition $T1<T2$ is satisfied is realized by application of the accelerator pedal reaction force and the assistant braking force. Specifically, when the needed braking force Fb is comparatively small, the accelerator pedal reaction force is increased by using the accelerator pedal reaction force control unit 105 so that the driver cannot depress (or is hard to depress) the accelerator pedal. In this manner, the needed braking force Fb is realized.

In the meantime, when the needed braking force Fb is comparatively large, the accelerator pedal reaction force is increased by using the accelerator pedal reaction force control unit 105 so that the driver cannot depress (or is hard to depress) the accelerator pedal, and additionally the assistant braking force is generated by using the braking force control unit 106. In this manner, the needed braking force Fb is realized.

The magnitude of the applied accelerator pedal reaction force and the applied assistant braking force may be arbitrary. However, when the braking force Fb is generated in the non-priority vehicle, it is preferred that it should be generated primarily based on the increase of the accelerator pedal reaction force and the application of the assistant braking force should be used for auxiliary purpose.

On the contrary, when the condition $T1<0$ arises after the priority vehicle passed through the intersection and it is needed to gradually decrease the braking force Fb to zero, it is preferred that the assistant braking force is first set to zero and then the accelerator pedal reaction force is gradually decreased.

In order to carry out smoothly the above-mentioned deceleration control of the non-priority vehicle based on the once determined priority, it is preferred that the determined priority remains unchanged in principle until the non-priority vehicle passes through the intersection.

However, a problem may arise when the priority is fixed to the once determined priority. For example, when the priority vehicle slows down in front of the intersection for a certain reason, the non-priority vehicle also slows down in order to make the priority vehicle pass through the intersection preferentially. In the following, this case will be referred to as case A. In this case, both the vehicles stay in front of the intersection, and smooth intersection traffic may not be realized.

Moreover, when another priority vehicle is newly detected, it will be necessary to perform the priority setting again. In the following, this case will be referred to as case B.

In the case A, the priority vehicle slows down by autonomous operation of the driver due to the discrepancy of priority setting, the avoidance of the front obstacle, the access to the parking lot along the road, etc.

In the case B, a cut-in vehicle arises ahead of the priority vehicle. Moreover, in the case B, a third vehicle from the parking lot along the road cuts in ahead of the priority vehicle, or an emergency vehicle, such as an ambulance, a fire engine or a patrol car, is going to pass the priority vehicle and advance into the intersection.

In this embodiment, the countermeasure for the case A is as follows. When the vehicle speed of each of the priority vehicle (the crossing vehicle) and the non-priority vehicle (the self-vehicle) becomes below a predetermined speed and the non-priority vehicle is located on the left side of the priority vehicle, it may be configured to cancel the braking control for the non-priority vehicle and to permit the passage of the self-vehicle through the intersection without the restriction of the crossing vehicle.

The control in this case is different from the usual control, the deceleration control for the non-priority vehicle is autonomous control by the driver, and the guidance to the vehicle passengers (especially to the driver) is unnecessary. However, it is desirable that the user notifying unit 104 is exceptionally used to notify the driver that the braking control (or the non-priority control) is currently canceled.

The user notifying unit 104 in this embodiment may include a loudspeaker for notifying the cancellation of the braking control by voice announcement, a display for notifying the same visually, or a vibration generator for vibrating the steering wheel or the driver's seat for notifying the cancellation of the braking control. When the user notifying unit 104 is provided with a display, the display may be used in common with the navigation system as an external device of the vehicle control device 100. Alternatively, the display of the user notifying unit 104 may be an overhead display utilizing hologram imaging, or it may be a display embedded in the instrument panel.

In this embodiment, the countermeasure for the case B is as follows. It may be configured that the priority setting including the newly appearing vehicle is performed again. Alternatively, it may be configured that, in consideration of intersection entrance approaching, all the appearing vehicles are determined as being the priority vehicle without special operation and the deceleration control for the non-priority vehicle is performed on the self-vehicle for safety.

In order to avoid the discrepancy of priority setting, it is preferred that the vehicle position detecting accuracy (for example, GPS accuracy) is also transmitted to the neighboring vehicles by the vehicle-to-vehicle communication, together with the vehicle current position. It may be configured that the crossing vehicle is always set as being the priority vehicle for safety when a possibility that the self-vehicle and the other vehicle cross each other is detected and the crossing vehicle has a vehicle position detecting accuracy that is lower than that of the self-vehicle.

In this case, when the received detecting accuracy of the crossing vehicle is lower than that of the self-vehicle but higher than a predetermined level, it may be determined that the priority determination should be performed in the normal manner and the crossing vehicle is not always determined as being the priority vehicle, since the vehicle current position received through the vehicle-to-vehicle communication is trustable.

Alternatively, in order to avoid the discrepancy of priority setting, it may be configured that, after a priority is determined for each vehicle, the information related to the priority determined for each vehicle is exchanged mutually between the vehicles having crossing possibility by using the vehicle-to-vehicle communication.

If the priority-related information is exchanged between the vehicles, this makes it possible for each vehicle to detect whether the priority determined for the self-vehicle and the priority determined for the crossing vehicle are in agreement. Thus, it is possible to prevent the discrepancy of priority setting.

In the case in which a discrepancy in the priority determined for the respective vehicles arises, as a result of exchanging the priority-related information, a conceivable technique for obviating the problem is to adjust the once determined priority by performing the priority setting again or by changing the priority determined by the vehicle having the lower position detecting accuracy level, according to the priority determined by the vehicle having the higher position detecting accuracy level.

In the case in which the self-vehicle approaches a predetermined distance in front of the intersection but does not receive the priority-related information from the crossing vehicle, it is preferred for safety that the crossing vehicle is determined as a priority vehicle and the self-vehicle is determined as a non-priority vehicle.

When the priority-related information is exchanged between the vehicles in the above-mentioned way, the information related to the relative positions between the vehicles which have crossing possibility (such as the distance to the intersection, or the vehicle speed) may be replaced with or supplemented by the priority determined based on the vehicle information and/or the driver information which is stored in the storage unit 107 in the form of the database.

The vehicle information in this case may indicate whether the vehicle concerned is an emergency vehicle (an ambulance, a fire engine, a patrol car, etc.). For example, when the vehicle information received from the crossing vehicle indicates that the crossing vehicle is an emergency vehicle, it is preferred to determine the crossing vehicle as a priority vehicle and determine the self-vehicle as a non-priority vehicle without checking the other conditions including the distance to the intersection.

The vehicle information and the driver information in this case are used to determine the priority for the self-vehicle such that the self-vehicle may be set to a priority vehicle preferentially or compulsorily with respect to the access to a desired intersection, and to transmit the determined priority information to a neighboring vehicle by using the vehicle-to-vehicle communication. The vehicle information includes information indicating whether the self-vehicle is an emergency vehicle, and additionally it may include any of: a) the information indicating whether the charge for setting up a priority vehicle preferentially is paid; b) the information indicating the number of times in which the self-vehicle which should be a priority vehicle in the usual case assigned in the past the status of the priority vehicle to the crossing vehicle passing in a hurry through the intersection; and c) the information indicating whether the driver of the self-vehicle is an excellent driver who has committed neither the accident nor the violation of the traffic control regulations during a predetermined period of the past.

The above item a) is related to a pay service which can be used to set the self-vehicle as a priority vehicle preferentially by paying a predetermined charge beforehand or thereafter. This pay service will be useful for the user who is in a hurry.

The above item b) is a point-system service based on the spirit of mutual concessions. When the driver is not in a hurry, the status of a priority vehicle (or the right to become a priority vehicle) is assigned to others. Assigning the status of a priority vehicle to others enables the point of the driver to be accumulated. And when the driver is in a hurry, the self-vehicle is made into a priority vehicle preferentially by using the accumulated point.

In the above-described embodiment shown in FIG. 2, the vehicle control device of the invention is applied to the case in which both the self-vehicle and the other vehicle run straight through the intersection from the generally orthogonal directions. The present invention is not limited to such a case.

Figure 3:
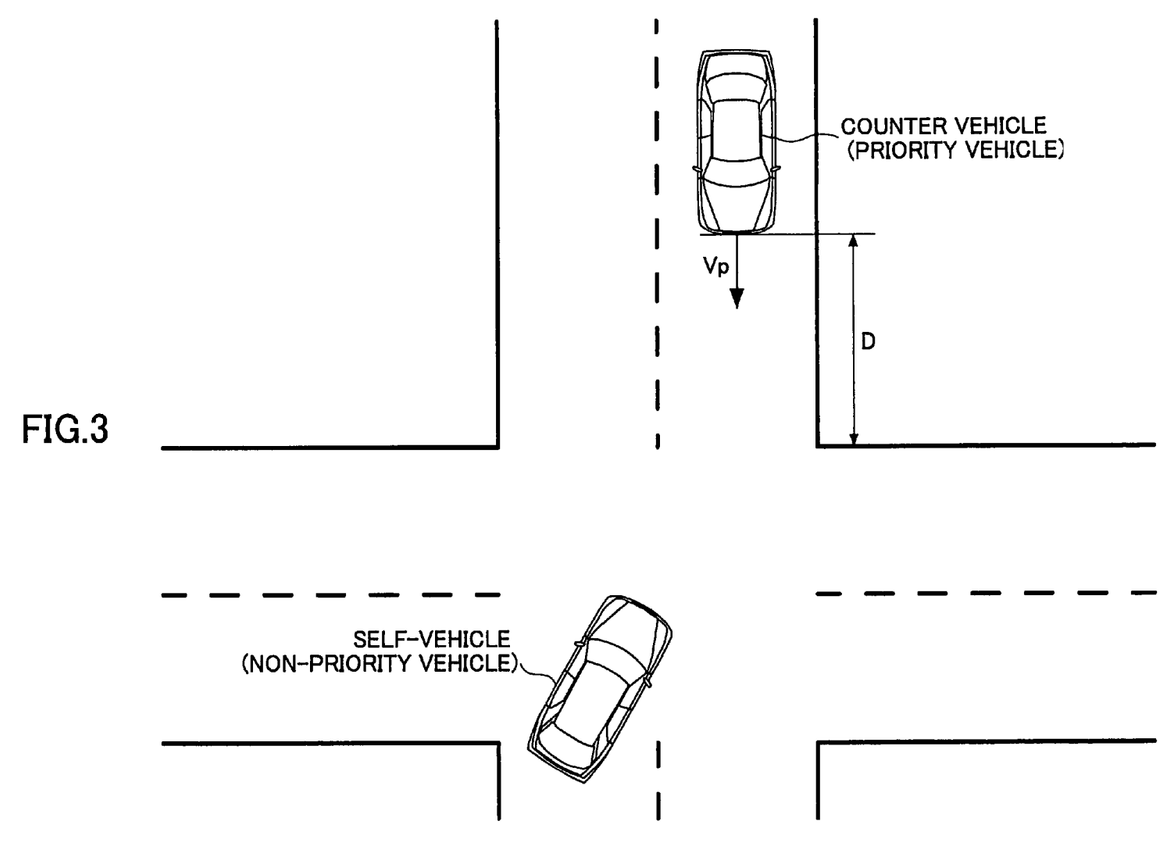
FIG. 3 is a diagram for explaining operation of the vehicle control device in an embodiment of the invention when the self-vehicle turns to the right at the intersection in front of the self-vehicle.

Moreover, the vehicle control device of the invention can be applied to the case in which there is a possibility that a right-turn vehicle and a running-straight vehicle cross each other at an intersection as shown in FIG. 3, or the case in which the self-vehicle on a comparatively narrow road is going to enter a comparatively wide road.

As shown in FIG. 3, when the self-vehicle is the right-turn vehicle and the non-priority vehicle, it is necessary to perform the braking control for the non-priority vehicle, so that the self-vehicle may certainly stop in the middle of the intersection. Other points are the same as those of the above-mentioned case of FIG. 2. When the running-straight vehicle decelerates or stops for a certain reason, the countermeasure that allows the self-vehicle to turn to the right preferentially is taken.

Figure 4:
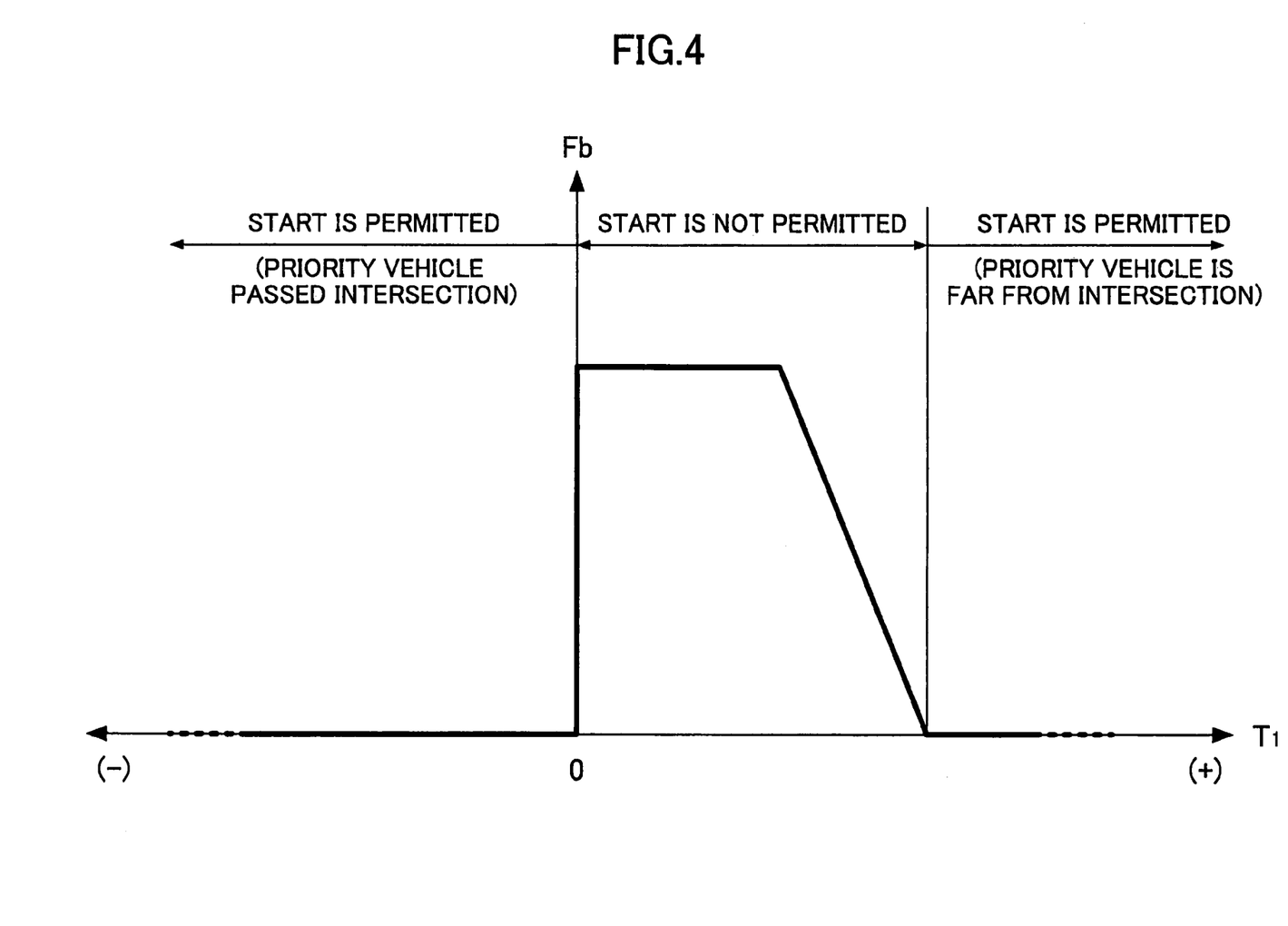
FIG. 4 is a diagram for explaining an example of the relationship between the time and the braking force imposed on the self-vehicle.

An example of change of a braking force Fb imposed on the self-vehicle (which is a non-priority vehicle) when performing a right-turn start from a stop is illustrated in FIG. 4.

FIG. 4 is a diagram for explaining an example of the relationship between the time T1 and the braking force Fb on the self-vehicle when performing a right-turn start from a stop.

As shown in FIG. 4, when T1<0, the running-straight vehicle (which is a priority vehicle) has already passed through the intersection. The braking force Fb on the non-priority vehicle is set to zero (Fb=0), and the non-priority vehicle is in the state in which performing the right-turn start without the deceleration control is permitted. When T1≧0, the braking force Fb that inhibits the self-vehicle from performing a start will be imposed until the time T1 reaches a predetermined value. After the time T1 exceeds the predetermined value, the braking force Fb is gradually decreased. When the time T1 is larger than a certain value, it is determined that the priority vehicle is sufficiently far from the intersection, and the braking force Fb is set to zero (Fb=0).

When turning to the right at the intersection or when entering the wide road from the narrow road, there is a case where the number of running-straight counter vehicles is large or the amount of traffic on the wide road is large. To overcome the situation in which the non-priority vehicle cannot easily turn to the right or enter the wide road, the above-mentioned technique of exchanging the priority information through communication may be used. For example, the vehicle control device of the invention may be configured so that, when the vehicle speed of the self-vehicle is zero and the period of a continuous right-turn waiting or continuous wide-road-access waiting state exceeds a predetermined time, the priority information which sets the self-vehicle as a priority vehicle compulsorily is broadcasted to neighboring vehicles having crossing possibility.

In any condition, when a traffic signal installed at the intersection in front of the vehicle is detected by the traffic signal detecting unit 102, it is preferred not to carry out the priority setting or to cancel the once determined priority, so as to allow the driver to perform operation following the traffic signal, so that the sense of incongruity may not given to the driver. Namely, when the self-vehicle is a non-priority vehicle and existence of the traffic signal is not detected, the above-described braking control for the non-priority vehicle will be carried out.

On the other hand, when the self-vehicle is a non-priority vehicle and existence of the traffic signal is detected by the traffic signal detecting unit 102 of the self-vehicle and the color of the turned-on light of the traffic signal is red, it is preferred that the braking control for the non-priority vehicle is initially performed to cause the self-vehicle to stop before the stop line, and thereafter the braking control is canceled. Canceling the braking control immediately should be avoided in this case.

According to the above-mentioned embodiment, each vehicle in which the vehicle control device of this embodiment is incorporated when passing through the intersection, the deceleration control is carried out in the vehicle used as non-priority so that the priority about intersection passage of a self-vehicle and a self-vehicle, and the neighboring vehicle that has crossing possibility may be set up autonomously and it may pass through the intersection in order with this high priority. Each vehicle can pass through the intersection safely, without being dependent on the traffic control by infrastructure, such as a traffic signal.

Since the vehicle which is the non-priority can also be managed with necessary minimum deceleration, the unnecessary stop of the waiting before the traffic signal is eliminated, the vehicle can pass through the intersection smoothly, and the intersection traffic control can be carried out safely and smoothly.

The present invention can be used for the vehicle control device which performs braking control in the vehicle. There may be no restriction of the appearance, weight, size, and running performance of the vehicle in which the vehicle control device is incorporated.

The present invention is not limited to the above-described embodiments, and variations and modifications may be made without departing from the scope of the invention.

Further, the present application is based upon and claims the benefit of priority of Japanese patent application No. 2005-233171, filed on Aug. 11, 2005, the entire contents of which are incorporated herein by reference.

What is claimed is:

1. A vehicle control device which performs braking control of a vehicle, comprising:
   a priority setting unit determining, when a possibility that a self-vehicle and another vehicle cross each other at an intersection in front of the self-vehicle is detected, a priority for each of the self-vehicle and said another vehicle with respect to access to the intersection, wherein the priority setting unit determines the priority for each of the self-vehicle and said another vehicle in accordance with a relative position between the self-vehicle and said another vehicle and a relationship in vehicle speed between the self-vehicle and said another vehicle; and
   a braking control unit performing the braking control of the self-vehicle in response to the priority setting unit determining that the self-vehicle has no priority over said another vehicle with respect to access to the intersection, the braking control including calculation and performance of braking in a precise quantity such that the self-vehicle continues moving and enters the intersection a predetermined amount of time after said another vehicle passes through the intersection,
   wherein, the calculation of braking in the precise quantity such that the self-vehicle continues moving and enters the intersection the predetermined amount of time after said another vehicle passes through the intersection includes determining a braking force Fb in accordance with the formula $Fb=K/(T1+T2)^n$ where K is a positive constant, T1 is an estimated time for the self-vehicle to pass through the intersection, T2 is an estimated time for said another vehicle to pass through the intersection, and n is a positive real number.

2. The vehicle control device according to claim 1 wherein, when the self-vehicle has no priority over said another vehicle with respect to access to the intersection, the braking control unit converts coordinates indicating an actual position of said another vehicle into new coordinates which indicate a virtual position of said another vehicle as if said another vehicle run on a same lane in a same direction as a preceding vehicle of the self-vehicle, and performs the braking control of the self-vehicle so as to maintain a predetermined distance between the self-vehicle and said another vehicle based on the new coordinates.

3. The vehicle control device according to claim 1 wherein, when the self-vehicle has no priority over said another vehicle with respect to access to the intersection, the braking control unit performs the braking control of the self-vehicle by determining a position of a first predetermined distance from the intersection as being a target stop position until said another vehicle passes through the intersection, and cancels the performance of the braking control the instant said another vehicle passes through the intersection.

4. The vehicle control device according to claim 1 wherein, when the self-vehicle arrives at a second predetermined distance from the intersection and a distance between said another vehicle and the intersection is smaller than the second predetermined distance, the priority setting unit determines the priority for each of the self-vehicle and said another vehicle so that the self-vehicle has no priority over said another vehicle.

5. The vehicle control device according to claim 1 wherein, when the self-vehicle arrives at a third predetermined distance from the intersection and a time for said another vehicle to reach the intersection is smaller than a time for the self-vehicle to reach the intersection, the priority setting unit determines the priority for each of the self-vehicle and said another vehicle so that the self-vehicle has no priority over said another vehicle.

6. The vehicle control device according to claim 1 wherein the priority setting unit does not change the determined priority until the self-vehicle arrives at a fourth predetermined distance from the intersection before the self-vehicle passes through the intersection.

7. The vehicle control device according to claim 6 wherein, when no priority vehicle exists until the self-vehicle arrives at the fourth predetermined distance from the intersection and a possibility that the self-vehicle and a new vehicle cross each other at the intersection is detected thereafter, the vehicle control device determines a priority for each of the self-vehicle and the newly detected vehicle so that the self-vehicle has no priority over the newly detected vehicle, and performs the braking control of the self-vehicle so that the self-vehicle enters the intersection after the newly detected vehicle passes through the intersection.

8. The vehicle control device according to claim 6 wherein, when no priority vehicle exists until the self-vehicle arrives at the fourth predetermined distance from the intersection and a possibility that the self-vehicle and a new vehicle cross each other at the intersection is detected thereafter, the new vehicle having a position detecting accuracy level lower than that of the self-vehicle and being located within a range of a fifth predetermined distance from the intersection the instant the self-vehicle arrives at the fourth predetermined distance, the priority setting unit determines a priority for each of the self-vehicle and the newly detected vehicle so that the self-vehicle has no priority over the newly detected vehicle.

9. The vehicle control device according to claim 8 wherein, when the position detecting accuracy level of the newly detected vehicle is lower than that of the self-vehicle but higher than a predetermined level, the priority setting unit determines a priority for each of the self-vehicle and the newly detected vehicle so that the self-vehicle has a priority over the newly detected vehicle.

10. The vehicle control device according to claim 1 wherein, when both a vehicle speed of said another vehicle and a vehicle speed of the self-vehicle are less than a predetermined speed, after the crossing possibility is detected and the non-priority of the self-vehicle to said another vehicle is set up, and the self-vehicle is located on a left side of said another vehicle, the braking control unit cancels the braking control of the self-vehicle.

11. The vehicle control device according to claim 10 wherein, when the braking control of the self-vehicle is canceled, a notification unit gives a notification of the braking control cancellation to a passenger of the self-vehicle.

12. The vehicle control device according to claim 1 wherein, when the self-vehicle has no priority over said another vehicle and a traffic signal in the intersection is detected, the braking control unit cancels the braking control of the self-vehicle.

13. The vehicle control device according to claim 12 wherein, when the self-vehicle has no priority over said another vehicle and a traffic signal in the intersection is detected and a color of a turned-on light of the traffic signal is red, the braking control unit performs the braking control of the self-vehicle to cause the self-vehicle to stop by a stop line of the intersection, and thereafter cancels the braking control of the self-vehicle.

14. The vehicle control device according to claim 1 wherein, when the self-vehicle has no priority over said another vehicle and no traffic signal in the intersection is detected, the braking control unit cancels the braking control of the self-vehicle.

15. The vehicle control device according to claim 1 wherein the vehicle control device is configured to transmit first priority information set up in the self-vehicle, to another vehicle with crossing possibility through communication, and configured to receive second priority information set up in said another vehicle, from said another vehicle through communication.

16. The vehicle control device according to claim 15 wherein, when the second priority information is not received from said other vehicle until the self-vehicle reaches a sixth predetermined distance from the intersection, the priority setting unit determines the priority for each of the self-vehicle and said other vehicle so that the self-vehicle has no priority over said another vehicle.

17. The vehicle control device according to claim 15 wherein the vehicle control device is configured so that, when a vehicle speed of the self-vehicle is zero and a period of a continuous waiting state exceeds a predetermined time, priority information which sets the self-vehicle as a priority vehicle compulsorily is broadcasted to neighboring vehicles having crossing possibility.

18. The vehicle control device according to claim 15 wherein the vehicle control device is configured so that, when a possibility that the self-vehicle and an emergency vehicle cross each other at the intersection is detected, the priority setting unit determines the priority for each of the self-vehicle and the emergency vehicle so that the self-vehicle has no priority over the emergency.

19. The vehicle control device according to claim 15 wherein the vehicle control device is configured such that each of the first and the second priority information exchanged between the self-vehicle and said another vehicle is set up in consideration of vehicle information or driver information of the self-vehicle and said another vehicle.

20. The vehicle control device according to claim 1 wherein a right-turn vehicle which is going to turn to the right at the intersection is determined by the priority setting unit as being a priority vehicle to the self-vehicle, and wherein, when the self-vehicle reaches a seventh predetermined distance from the intersection and the right-turn vehicle has not yet performed right-turn passage of the intersection, the priority setting unit cancels the priority determined for the right-turn vehicle and determines a priority of the self-vehicle over the right-turn vehicle.

21. The vehicle control device according to claim 1 wherein, when determining crossing possibility, the vehicle control device uses vehicle position information which indicates a vehicle position of each of the self-vehicle and other vehicles and is defined as a two-dimensional area.

22. The vehicle control device according to claim 1 wherein the vehicle control device is configured to communicate with neighboring vehicles via a relay station installed in the intersection.

* * * * *